US009744386B2

(12) United States Patent
Baughman et al.

(10) Patent No.: US 9,744,386 B2
(45) Date of Patent: Aug. 29, 2017

(54) SELF-STANDING FALL ARREST SYSTEM

(71) Applicant: Gorbel, Inc., Fishers, NY (US)

(72) Inventors: Allen Baughman, Rush, NY (US); Keith Buddendeck, Brighton, NY (US); James G. Stockmaster, Sodus, NY (US); Dean C. Wright, Fairport, NY (US); Alexander Z. Chernyak, Pittsford, NY (US); Brian G. Peets, Fairport, NY (US); Benjamin A. Strohman, Henrietta, NY (US); Blake Reese, Honeoye Falls, NY (US)

(73) Assignee: Gorbel, Inc., Fishers, NY (US)

( * ) Notice: Subject to any disclaimer, the term of this patent is extended or adjusted under 35 U.S.C. 154(b) by 0 days.

(21) Appl. No.: 15/071,617

(22) Filed: Mar. 16, 2016

(65) Prior Publication Data
US 2016/0271430 A1 Sep. 22, 2016

Related U.S. Application Data

(60) Provisional application No. 62/133,931, filed on Mar. 16, 2015, provisional application No. 62/187,513, filed on Jul. 1, 2015.

(51) Int. Cl.
| *A47K 1/04* | (2006.01) |
| *A62B 35/00* | (2006.01) |
| *F16M 11/42* | (2006.01) |
| *F16M 11/38* | (2006.01) |

(52) U.S. Cl.
CPC ......... *A62B 35/0068* (2013.01); *F16M 11/38* (2013.01); *F16M 11/42* (2013.01); *F16M 2200/06* (2013.01)

(58) Field of Classification Search
CPC  E06C 5/04; E06C 5/06; B65G 17/066; A62B 35/0068; F16M 11/42; F16M 11/38; F16M 2200/06
See application file for complete search history.

(56) References Cited

U.S. PATENT DOCUMENTS

| 2,383,172 A | 8/1945 | Wagner et al. |
| 2,675,209 A | 4/1954 | Freed |
| 3,791,338 A | 2/1974 | Keller, Jr. |
| 4,607,724 A | 8/1986 | Hillberg |
| 4,648,780 A | 3/1987 | Harms et al. |

(Continued)

FOREIGN PATENT DOCUMENTS

| CA | 2557985 | 2/2008 |
| DE | 2325029 | 11/1973 |
| GB | 2473284 | 3/2011 |

OTHER PUBLICATIONS

PCT/US2016/022585 An Unofficial Invitation to Pay Additional Fees, and, Where Applicable Protest Fee dated Jun. 15, 2016 for PCT/US2016/022585 filed Mar. 16, 2016, Corresponds to U.S. Appl. No. 15/071,617; Inventor Allen Baughman et al.

(Continued)

*Primary Examiner* — Amy Sterling
(74) *Attorney, Agent, or Firm* — Duane C. Basch; Basch & Nickerson LLP

(57) ABSTRACT

An adjustable fall arrest system is disclosed, where the system employs a four-bar linkage and cantilevered beam arrangement to provide the fall arrest support.

20 Claims, 20 Drawing Sheets

(56) References Cited

U.S. PATENT DOCUMENTS

| | | | | |
|---|---|---|---|---|
| 4,749,324 A | * | 6/1988 | Rulison | B66C 23/48 |
| | | | | 212/261 |
| 5,076,448 A | * | 12/1991 | Ballard | B66C 23/48 |
| | | | | 212/261 |
| 5,518,553 A | * | 5/1996 | Moulder | B60S 3/008 |
| | | | | 134/167 R |
| 5,584,646 A | * | 12/1996 | Lewis | B66C 23/36 |
| | | | | 180/211 |
| 6,065,621 A | | 5/2000 | Fatemi et al. | |
| 6,129,226 A | | 10/2000 | Donovan | |
| 6,164,625 A | * | 12/2000 | Shockley | B66C 23/48 |
| | | | | 254/8 B |
| 6,467,576 B2 | | 10/2002 | Figura et al. | |
| D465,635 S | * | 11/2002 | Hong | D34/28 |
| 6,488,161 B1 | | 12/2002 | Bean | |
| 7,611,007 B2 | * | 11/2009 | Lim | B65G 17/066 |
| | | | | 198/850 |
| D644,811 S | * | 9/2011 | Clark | D34/33 |
| 2008/0174082 A1 | | 7/2008 | Bunker | |
| 2009/0134107 A1 | * | 5/2009 | Doggett | B64G 4/00 |
| | | | | 212/239 |
| 2010/0213007 A1 | * | 8/2010 | Richards | E06C 1/08 |
| | | | | 182/107 |
| 2011/0206488 A1 | | 8/2011 | Windsor et al. | |
| 2014/0262627 A1 | | 9/2014 | Balcom | |

OTHER PUBLICATIONS

PCT/US2016/022585 An International Search Report and Written Opinion dated Sep. 13, 2016; Corresponds to U.S. Appl. No. 15/071,617; Inventor Allen Baughman et al.

* cited by examiner

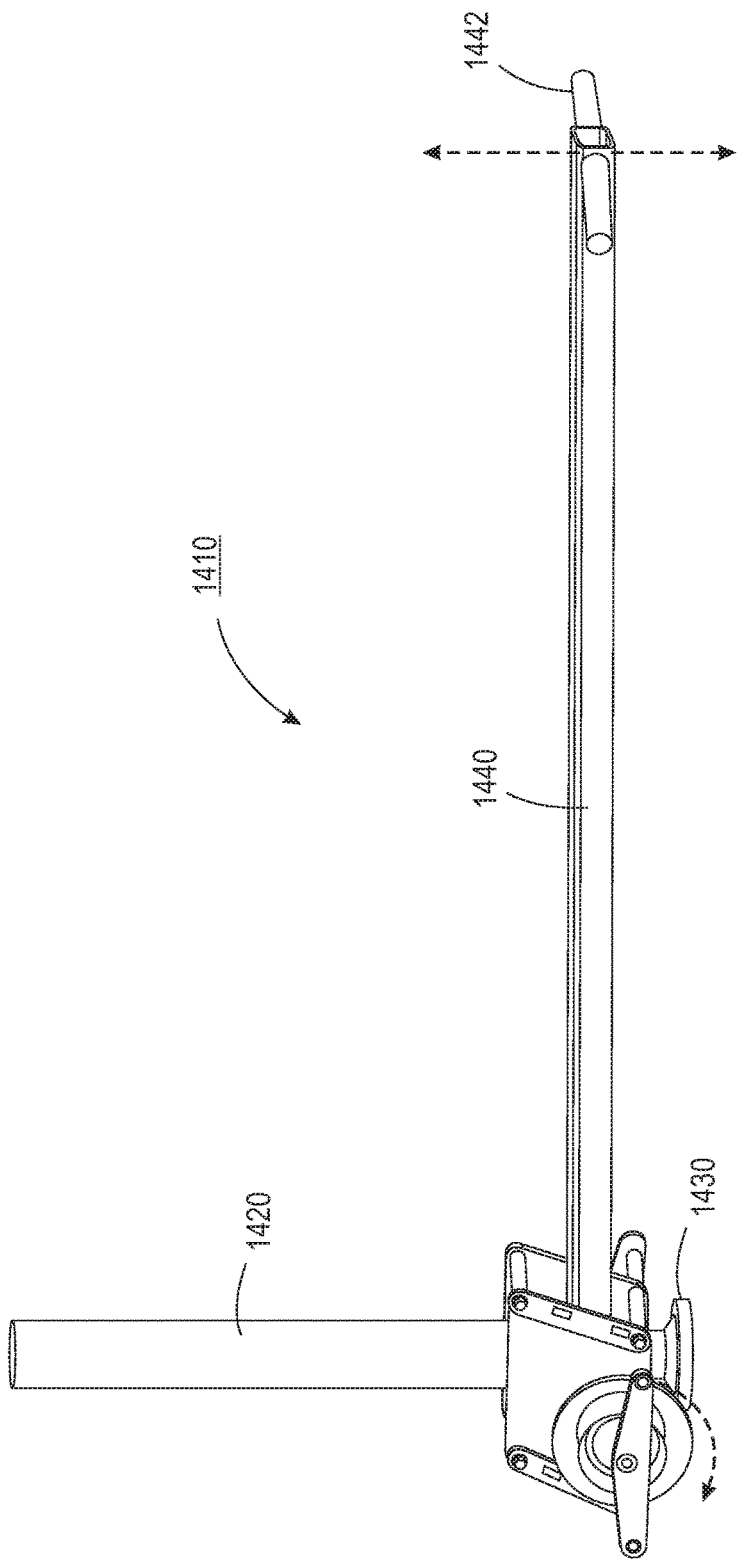

SELF-STANDING FALL ARREST SYSTEM

This application claims priority under 35 U.S.C. §119(e) from U.S. Provisional Patent Application 62/133,931 for a SELF-STANDING FALL ARREST SYSTEM, filed Mar. 16, 2015 by Allen Baughman et al., and U.S. Provisional Patent Application 62/187,513 for a SELF-STANDING FALL ARREST SYSTEM, filed Jul. 1, 2015 by Allen Baughman et al., both of which are hereby incorporated by reference in their entirety.

Disclosed herein are various embodiments, features and functions of a portable, self-standing fall arrest apparatus or system. In the disclosed embodiments, the fall arrest system is adjustable between one of at least two operating heights and is easily moved into place, and raised to a desired operating height. Furthermore, in several embodiments the system includes at least one electrically actuated component that raises the components from a storage/transport position to an operating position.

BACKGROUND AND SUMMARY

The system disclosed herein is understood to be used with a rope, cable, strap, lanyard or similar means connected between the device and a harness worn by the user whose fall is to be arrested. Pursuant to Occupational Safety and Health Administration (OSHA) and other work-place regulations and practices, workers that are working above a certain height are required to employ a fall arresting safety device of some sort to reduce injuries in the event of an accidental fall.

In situations where workers are unable to attach tethers to existing structures temporary, portable systems are used. Examples of such systems are sold by LifLine (e.g., Grabber-RM; www.lifline.com), FlexiGuard (EMU Mobile & Jib portable; www.safetyequipmentsolutions.com), Fall Protection Systems (Telescoping FPS; http://www.fallprotectionsystems.com) and others. However, such systems are either cumbersome to move, often needing a fork truck to even slightly adjust position, or require multiple people to erect the units, resulting in worker fatigue even before the actual work tasks are initiated. Hence, an improved fall arrest system is needed.

The disclosed embodiments combine both steel and aluminum components for improved strength/weight ratios and to provide damping to the forces or shock received by the system in the event of a fall. In one embodiment the system may be used at multiple heights (e.g., 18' and 22'), and may be erected indoors or out in a matter of minutes using either electrically driven or manually drivable actuators. Moreover, the 4-bar linkage design of the fall arrest system enables the system to be erected without requiring additional space beyond that occupied by the system at its erected height. In other words, if the system is to be erected to the 22' height, then it only requires a 22' height clearance and not some greater height in order to erect the system by a tip-up jib design, etc. This compact design allows the fall arrest system to be used in tight spaces.

The disclosed fall arrest system is suitable for use when maintaining aircraft, heavy equipment, or heavy machinery, and can be easily moved into place and assembled. The design allows for quick attachment to a forklift, truck, or related towing devices and the unit may be maneuvered so that the arrest equipment anchorage point is directly above the user as work is performed. Used in conjunction with a full body harness and retractable lanyard, the system provides a complete fall arrest system "on the go."

Disclosed in embodiments herein is a fall arrest system, comprising: a base including a base support structure, a plurality of wheels (incl. caster wheels) attached to the support structure to allow the system to be moved by a person, with or without mechanical assistance, over at least a short distance, a plurality of adjustable anchors extendable from the base support structure, a towing tongue extending from one end of the base support structure, a slidable cradle telescoping from the support structure, a battery storage box and an equipment storage box, each of said boxes located on either side of the base support structure, and a level indicator; a four-bar linkage operatively connected to said base support structure which operates as one of the bars in said linkage, said linkage further including an upper longitudinal tube and a lower longitudinal tube, each pivotably coupled to the base support structure and extending generally in parallel with one another and where the opposite ends of the longitudinal tube pieces are also pivotably connected to a cantilever linkage member, where a first linear actuator is connected between the base support structure and the lower longitudinal tube, and where spring struts are connected between the base support structure and each of the longitudinal tube pieces; and a cantilevered beam pivotably connected near a first end to the cantilever linkage member and a second linear actuator connected between the first end of the cantilevered beam and the cantilever linkage member, said cantilevered beam further including an extension beam connected to the opposite end of the cantilevered beam, said extension beam having a pivoting ring(s) or similar mechanism for attaching a flexible support (e.g., rope, cable, strap, etc.) to the free end thereof to arrest the fall of a worker attached to the arrest system via the flexible support.

Also disclosed in embodiments herein is a fall arrest system, comprising: a base, said base including a base support structure, a plurality of wheels attached to the support structure, a plurality of adjustable anchors extendable from the base support structure, a towing tongue extending from one end of the base support structure, a power source; a four-bar linkage operatively connected to said base support structure, which operates as one of the bars in said linkage, said four-bar linkage further including an upper longitudinal tube and a lower longitudinal tube, each pivotably coupled to the base support structure and extending generally in parallel with one another, and where the opposite ends of the longitudinal tube pieces are also pivotably connected to a cantilever linkage member; and a cantilevered beam extending from the cantilever linkage member, said cantilevered beam having a mechanism for attaching a flexible support to the free end thereof to arrest the fall of a worker attached to the arrest system via the flexible support.

Further disclosed in embodiments herein is A fall arrest system, comprising: a base including a base support structure, a plurality of wheels attached to the support structure to allow the system to be moved by a person, with or without mechanical assistance, over at least a short distance, a towing tongue extending from one end of the base support structure, said towing tongue including an integrated tow dolly having at least one wheel and a stationary foot; a power source; a four-bar linkage operatively connected to said base support structure which operates as one of the bars in said linkage, said linkage further including an upper longitudinal tube and a lower longitudinal tube, each pivotably coupled to the base support structure and extending generally in parallel with one another, where a pivot location of at least one of said tubes is adjustable to control the angle of the linkage and resulting upper height, and where the opposite ends of the longitudinal tube pieces are also pivotably connected to a cantilever beam, wherein a linear actuator is operatively connected between the base support structure and one of the upper or lower longitudinal tubes; and the cantilevered beam pivotably connected near a first end to the cantilever linkage member and having a free end for attaching a flexible support thereto to arrest the fall of a worker connected to the arrest system via the flexible support.

BRIEF DESCRIPTION OF THE DRAWINGS

FIGS. 12A-12C, 13A-13D and 14 are illustrations of features that may be incorporated in alternative embodiments and configurations of a fall arrest system.

Figure 1A:
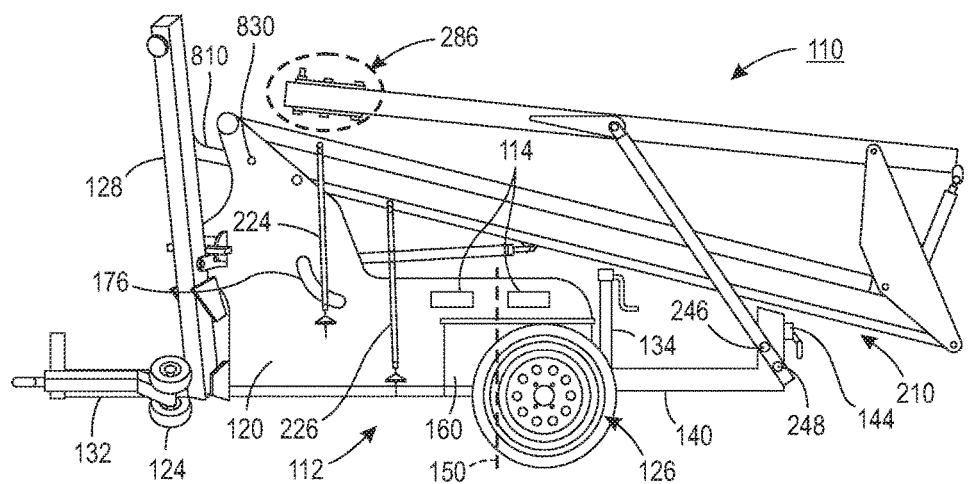
FIG. 1A is a side view of an embodiment of a fall arrest system in a stored or travel position.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

One embodiment of the fall arrest system 110 illustrated in the attached figures has the following approximate physical characteristics:

Weight: 2100 lbs.
Length of unit when being towed: 14.5'
Width of unit when being towed: 5.1'
Height of unit when being towed: 7.0'
Length of unit when in use: 9.6'
Width of unit with outriggers fully extended: 11.0'

Figure 2:
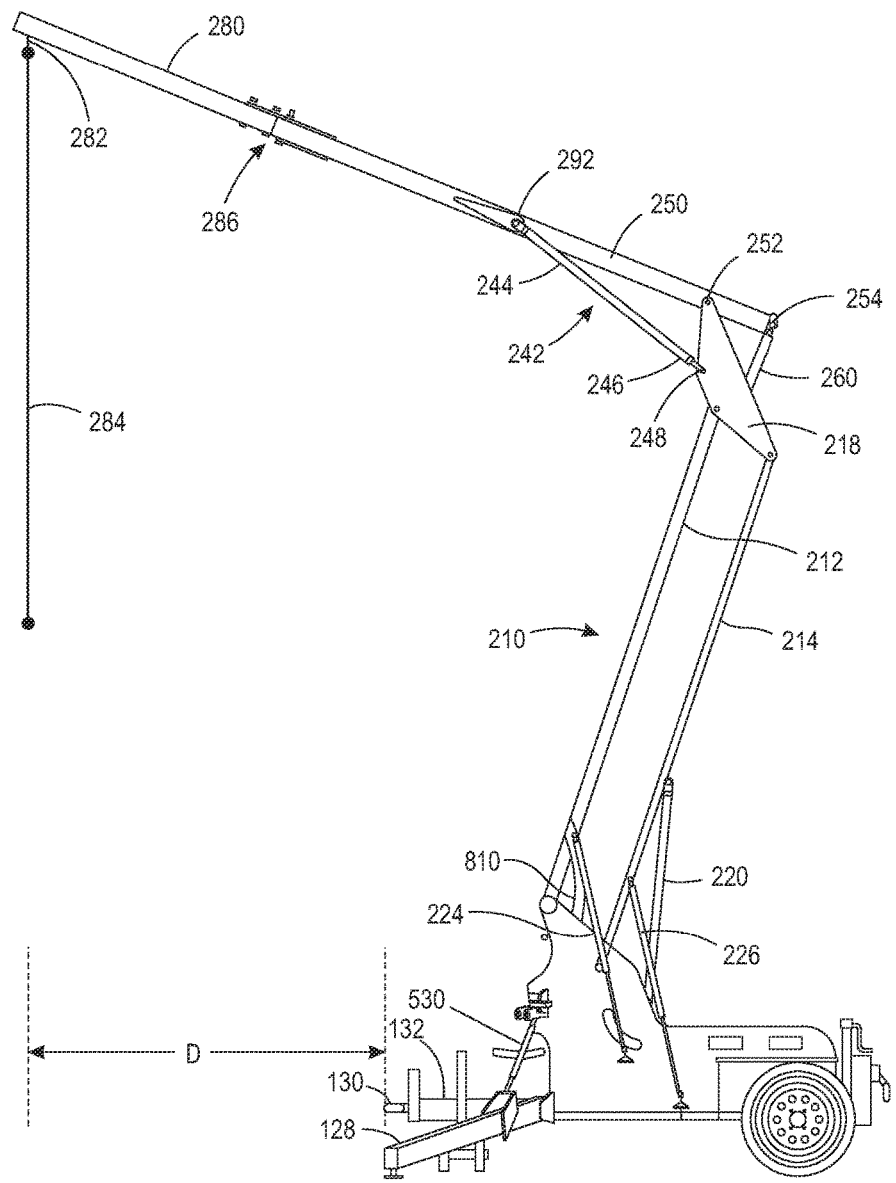
FIG. 2 is a side view of an embodiment of the fall arrest system of FIG. 1A in an erected or use position.
Figure 3:
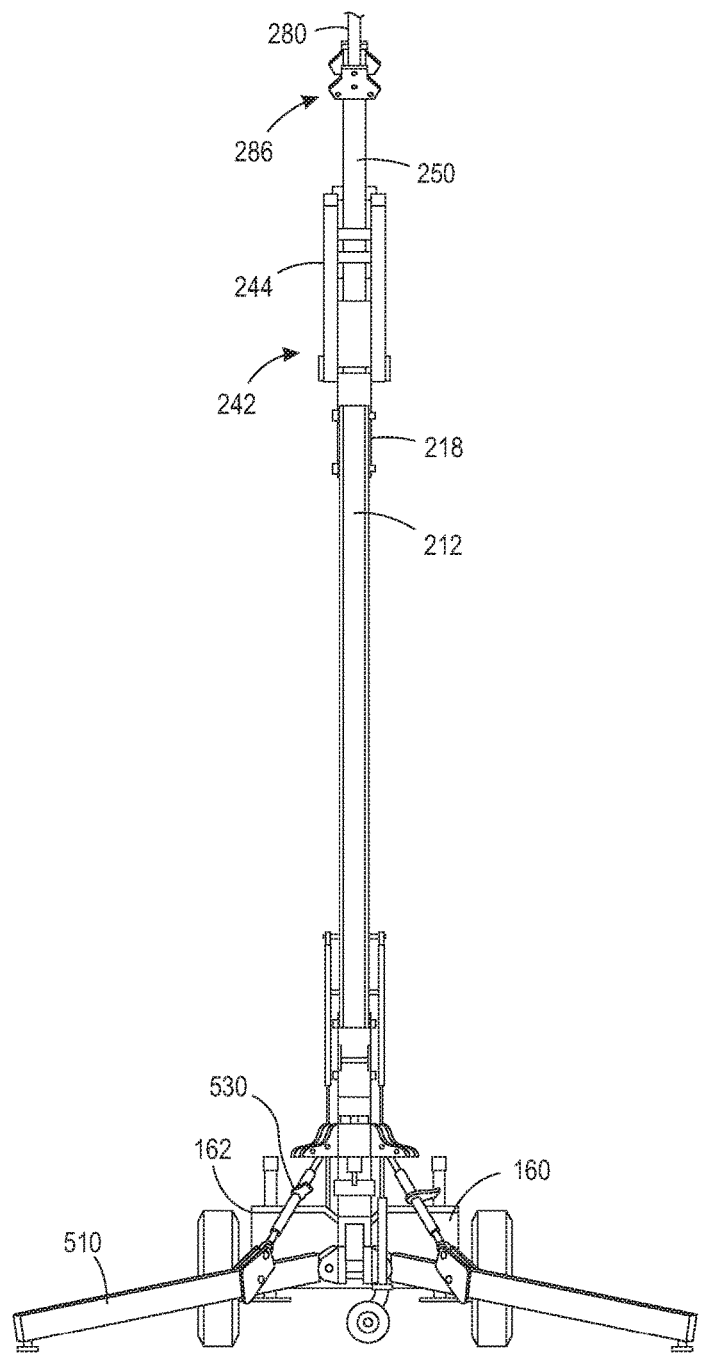
FIG. 3 is a front view of the fall arrest system of FIG. 2.

Referring to the figures, one embodiment of the fall arrest system depicted in FIG. 1A comprises a base 112 including a base support structure 120 to which a plurality of wheels such as caster wheels 124 and over-the-road transport wheels 126 are attached to allow the system to be moved. The sides of the base structure are made of machined steel plate (e.g., ~0.5" thick). As noted above, the system may be towed via a hitch, for example a ball hitch attachment 130 as illustrated in FIG. 2, on towing tongue 132, extending from one end of the base support structure, or manually moved by a person, without mechanical assistance, over at least a short distance. To move the system manually, the set of caster-mounted wheels 124 may be rotated into place (see e.g., FIGS. 2, 3 and 14) and the towing tongue would then rest upon the wheels.

For stabilizing and levelling the system a plurality of adjustable anchors 128, 134 are extendable from the base support structure as will be described further below. In one embodiment, base support structure 120 may also include a slidable cradle 140 telescoping from the rear of the support structure. An exposed end of the telescoping cradle includes a lock mechanism 144 to engage and support the lower longitudinal tube of the four-bar linkage when stored in the travel position.

Also attached to the support structure are a battery storage box 160 and an equipment storage box 162, each of said boxes located on either side of the base support structure. A level indicator 170 is also preferably attached at one or more positions on the support structure to assure that the anchors 128 and 134 are deployed and adjusted in a manner to assure that the system is erected in a generally vertical direction.

Figure 5A:
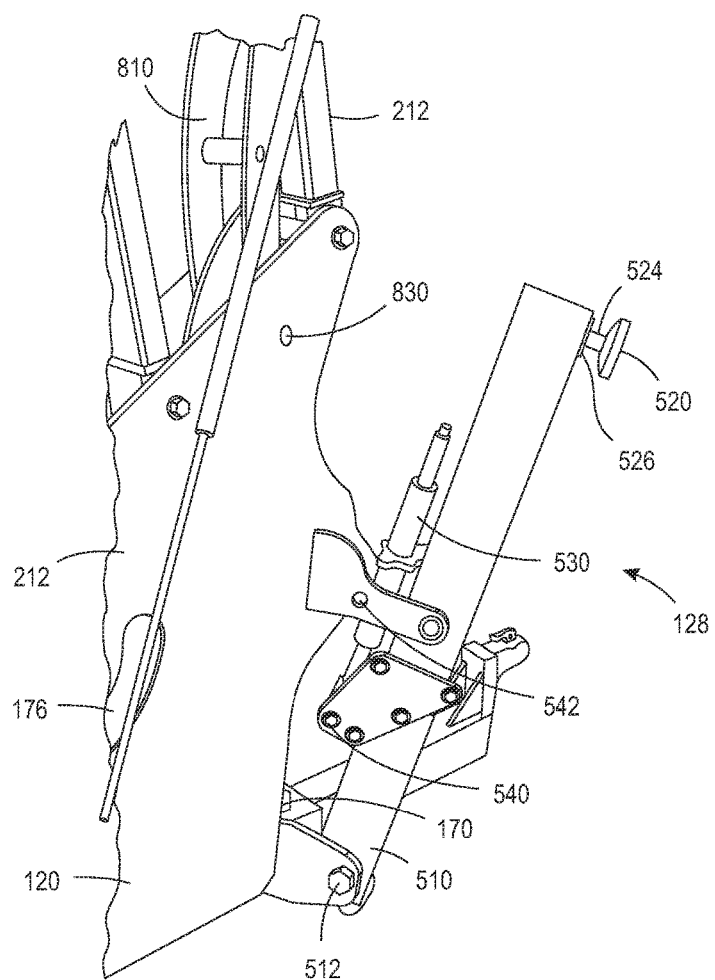
FIGS. 5A-5B are a detailed view of the outrigger anchor assembly and turnbuckle in a stored position.
Figure 5B:
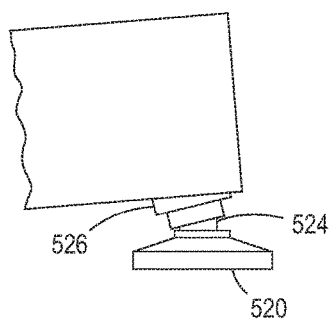

Referring specifically to FIGS. 5A-5B, which shows a stored outrigger, at least two of the adjustable anchors 128 are outriggers formed of an aluminum tubing member 510 pivotably attached at 512 via a bolt (e.g., A325) to one end to the base support structure 120. The opposite end of each outrigger has a pivoting ground-contacting pad 520 attached near an opposite end of the anchor, and also includes a turnbuckle or similar adjustable device 530 that can be pinned between a pivot point on the anchor at 540 and the base support structure at 542, to adjust the position of the anchor relative to the base structure in order to level the system. The ground-contacting pad further includes a ball and pin swivel connection 524, where the connection is attached to the anchor using a wedge-shaped washer or similar spacer 526 having an angle approximating the angle of the outrigger when deployed to assure that the contacting pad is in full contact normal to a floor or ground surface below it.

Referring once again to FIGS. 1 and 2, for example, a four-bar linkage 210 is operatively associated with the base support structure 120, and the structure operates as one of the bars in the linkage. The linkage further includes an upper longitudinal tube 212 made, for example, of 5"×3" steel tubing and a lower longitudinal tube 214 made of 5"×2" steel tubing, each of the upper and lower longitudinal tubes being pivotably coupled to the base support structure and extending generally in parallel with one another. The opposite ends of the longitudinal tubes 212 and 214 are also pivotably connected to a cantilever linkage member 218. A first linear actuator 220 is connected between the base support structure and the lower longitudinal tube, and in one embodiment spring struts 224 and 226 are also connected between the base support structure and the respective longitudinal tubes. The first linear actuator 220 and struts are employed to control the raising and lowering of the linkage members. Although not shown in its entirety because one end is pivotably anchored within the base support structure, the first actuator is a 24-inch long linear actuator (Manuf. by Thomson Part No. 7821193) and may be operated under power supplied to an associated electrical motor 230 (e.g., Manuf. by Thomson Part No. 7832145) by a battery(ies) 240 in battery box 160, in response to a switch (e.g., one push-button switch for up and one for down). As will be appreciated, alternate and additional power sources such as AC power (utility, generator, etc.) or other sources of remote DC power (e.g., vehicle-based) may be included as well. For emergencies, the actuators may also be manually driven by a cordless drill or ratchet (access to the actuator via the arcuate apertures 176 in each side of the base support structure) attached to the lower end of the actuator.

The uppermost portion of the system includes a cantilevered beam 250 pivotably connected at 252 to the cantilever linkage member near a first end 254, which extends beyond the pivot slightly, and a second linear actuator 260 connected between the first end of the cantilevered beam and the cantilever linkage member. The second actuator may be an 8 inch long linear actuator (Manuf. by Thomson, Part No. 7820950) that is similarly electrically driven by an associated motor (not shown), but may be manually extended and retracted as well. In an embodiment in which a further extension (e.g., height or reach) is desired, the cantilevered beam further includes an extension beam 280 connected to the opposite end of beam 250, where the extension beam has a pivoting ring(s) or similar mechanism 282 for attaching a flexible support 284 (e.g., rope, cable, strap, etc.) thereto to arrest the fall of a worker in a harness (not shown) attached to the arrest system via the flexible support. When erected to a use position, further movement or over-travel of the four-bar linkage 210 is prevented by arcuate member 810 and associated stop or bumper 820. Moreover, a pin is placed at position 830 to lock the four-bar linkage in place when fully extended.

Also included in the fall arrest system embodiments is a position-locking support 242 comprising a pair of tubular members 244 on either side of the cantilevered beam 250, and at least one cross-member (not shown), where the tubular members are pivotably attached between the cantilevered beam and the cantilever linkage member. As illustrated in FIG. 2, for example, the position-locking support may be pinned to cantilever linkage member via holes 246 or 248 to select between a plurality of pin positions to adjust the ultimate height (e.g., 18' or 22') of the cantilevered beam and the associated extension beam. When in a storage or transport position, the position-locking support is pinned to the cradle 140 for stabilizing the cantilever beam against lateral forces and to avoid lateral flexure of the pivot points in the cantilever linkage member.

Figure 4A:
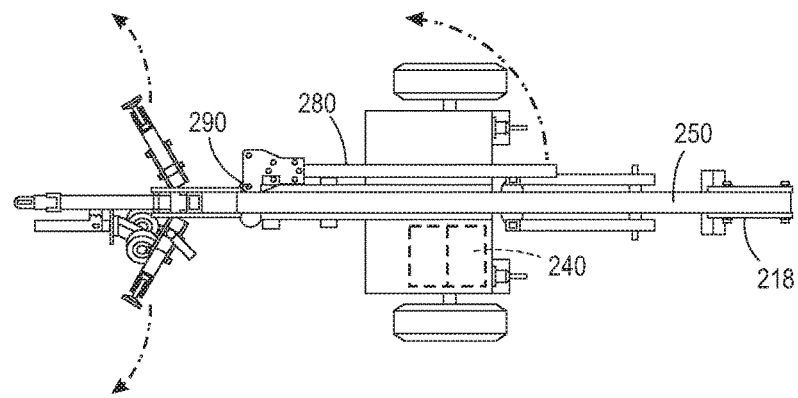
FIGS. 4A-4B are top views of the fall arrest system of FIG. 1A in a stored position and a use position, respectively.
Figure 4B:
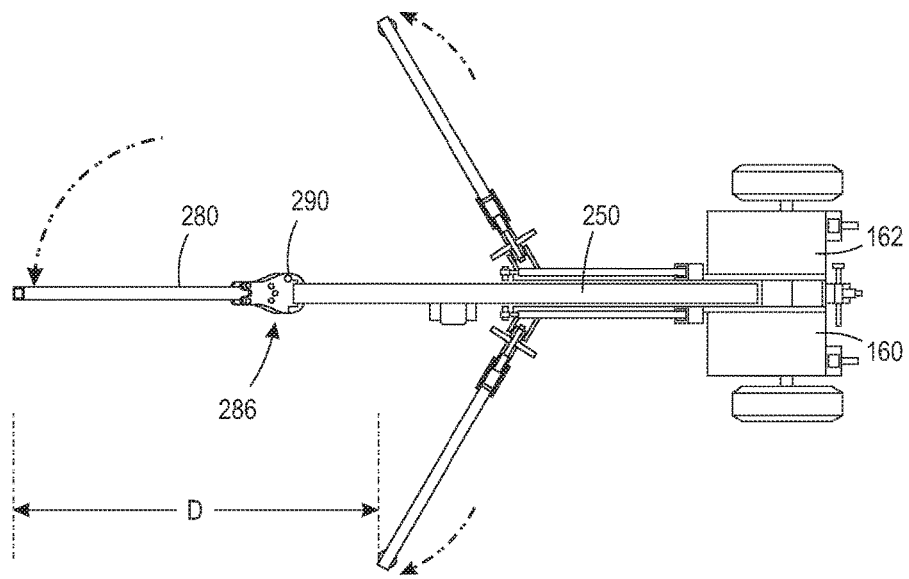

While there are a number of techniques by which the extension beam may be attached to or near the end of the cantilever beam (e.g., telescoping, parallel slide, butt-connection, etc.), the disclosed system employs an extension beam comprising an aluminum tubular member for the beam 280 that is pivotably attached by a vertically-oriented hinge 286 such that the extension beam swings between a transport position parallel with the cantilever beam and a use position that is end-to-end with the cantilevered beam as illustrated in FIGS. 4A-B. The use of an aluminum tube for the extension beam 280, in contrast to the steel tube used for the cantilever beam itself, not only reduces the weight of the extended beam, but further provides a greater degree of force/shock dampening in the event of a fall arrest. The extension beam further comprises a resilient polyurethane bushing 292 within the pivotable attachment at hinge point 290 connecting the extension beam to the cantilever beam. The polyurethane bushing also dampens lateral forces that may be transferred from the extension beam to the cantilever beam in the event of a fall.

Figure 6A:
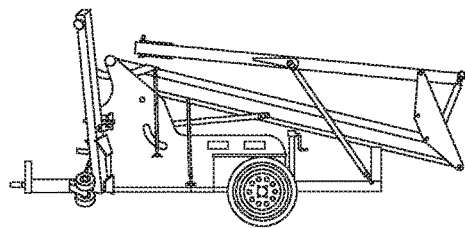
FIGS. 6A-6E are progressive illustrations of the fall arrest system of FIG. 1A showing stages from storage position to use position.
Figure 6B:
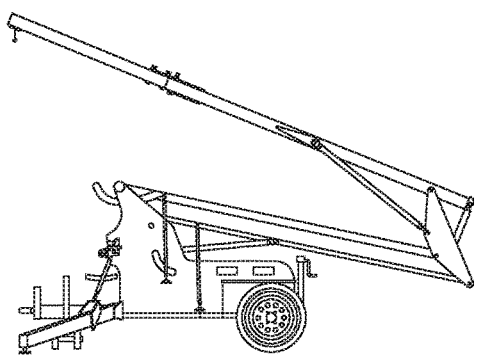
Figure 6C:
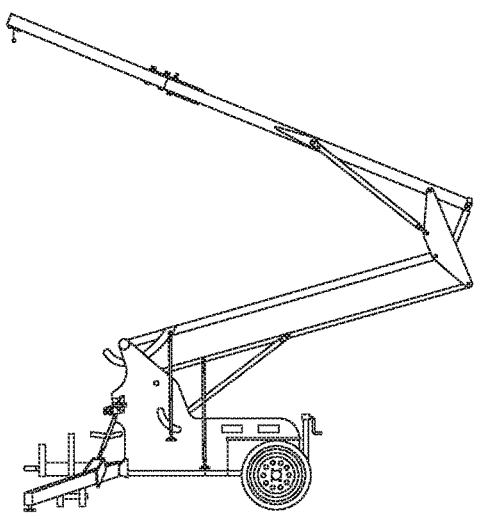
Figure 6D:
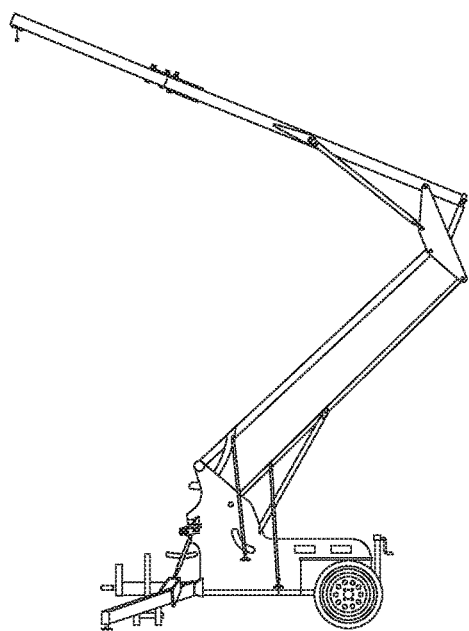
Figure 6E:
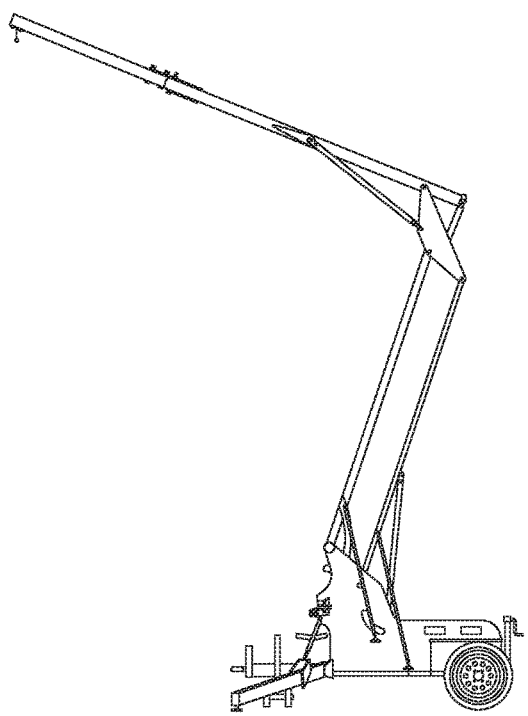
Figure 7:
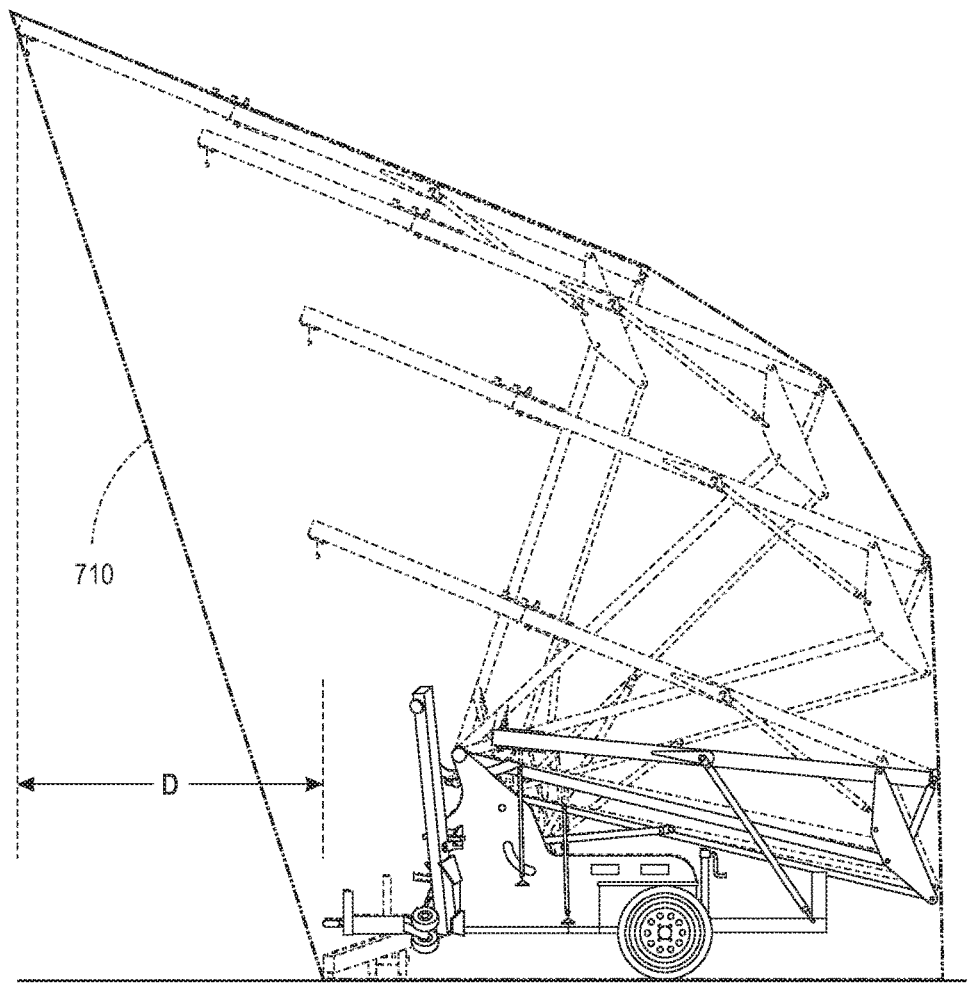
FIG. 7 is a progressive illustration of the fall arrest system of FIG. 1A showing stages from storage position to use position superimposed on one another to illustrate the "envelope" in which the system is erected.
Figure 8:
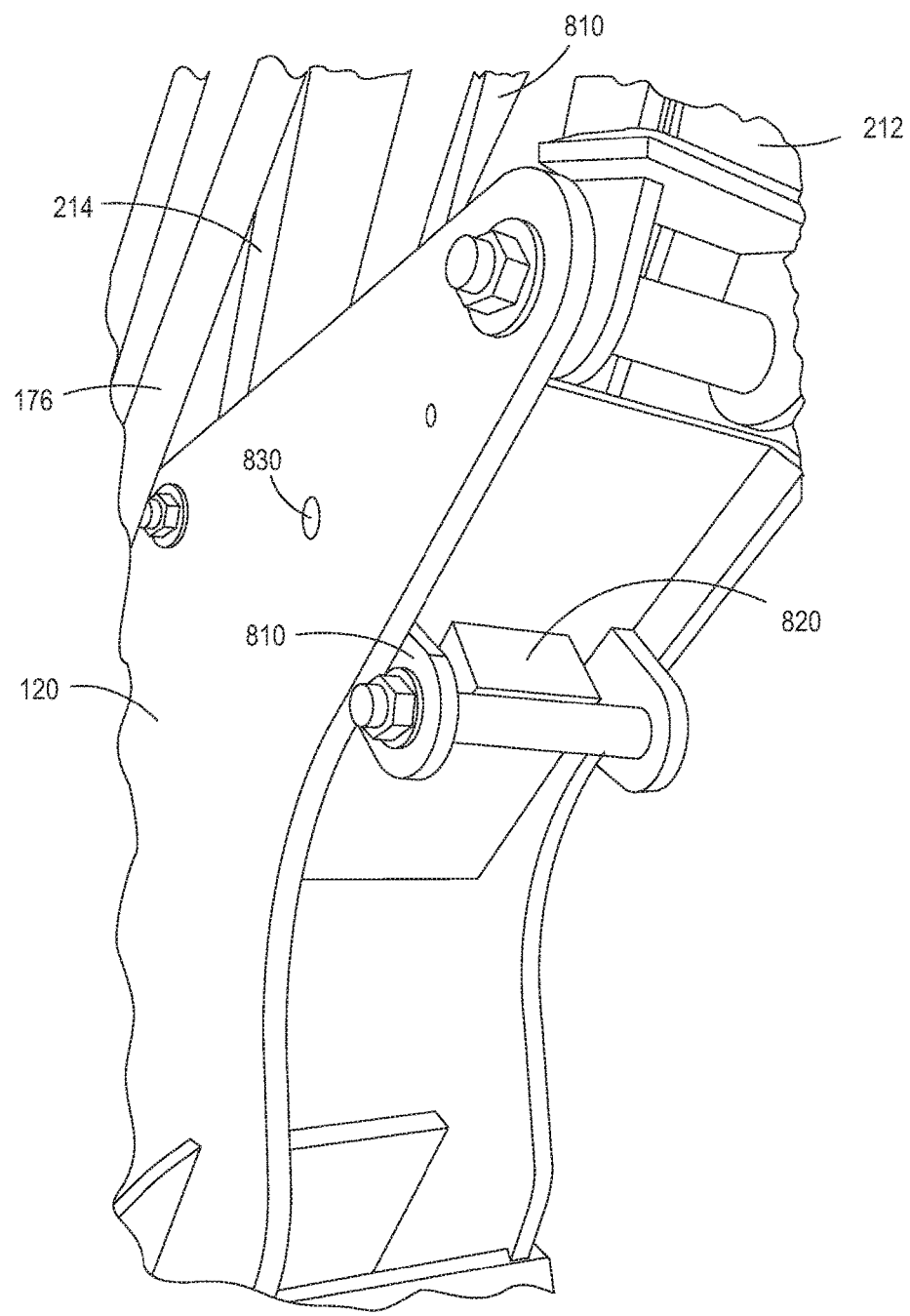
FIGS. 8-11B are enlarged views of components used in the system of FIG. 1A.
Figure 9:
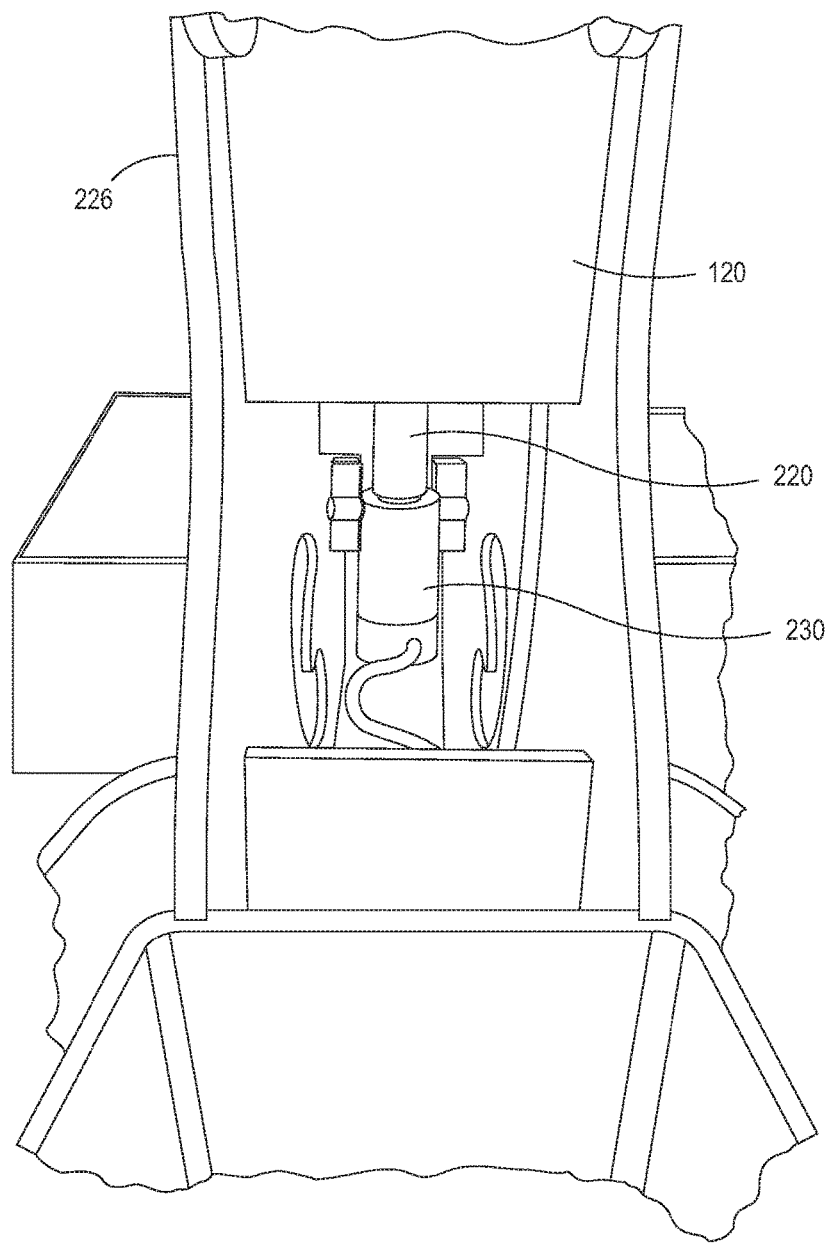
Figure 10:
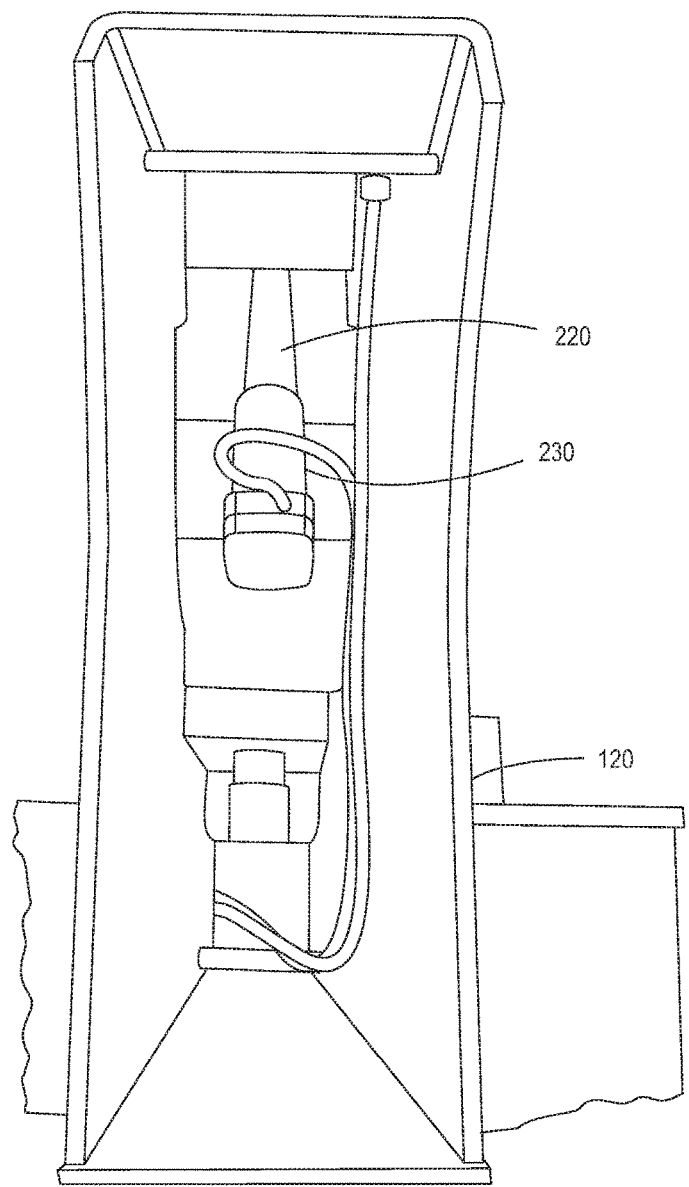
Figure 12A:
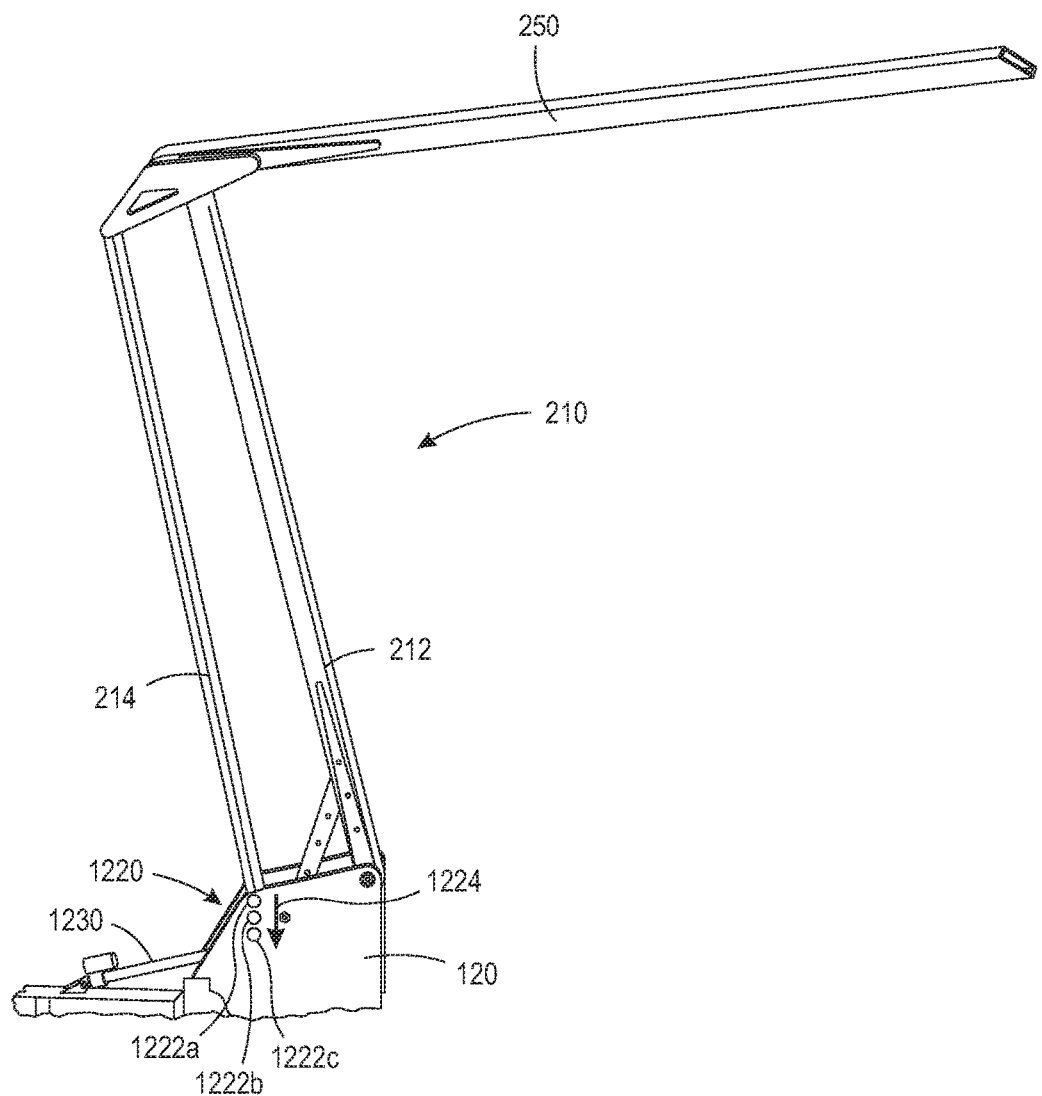
Figure 12B:
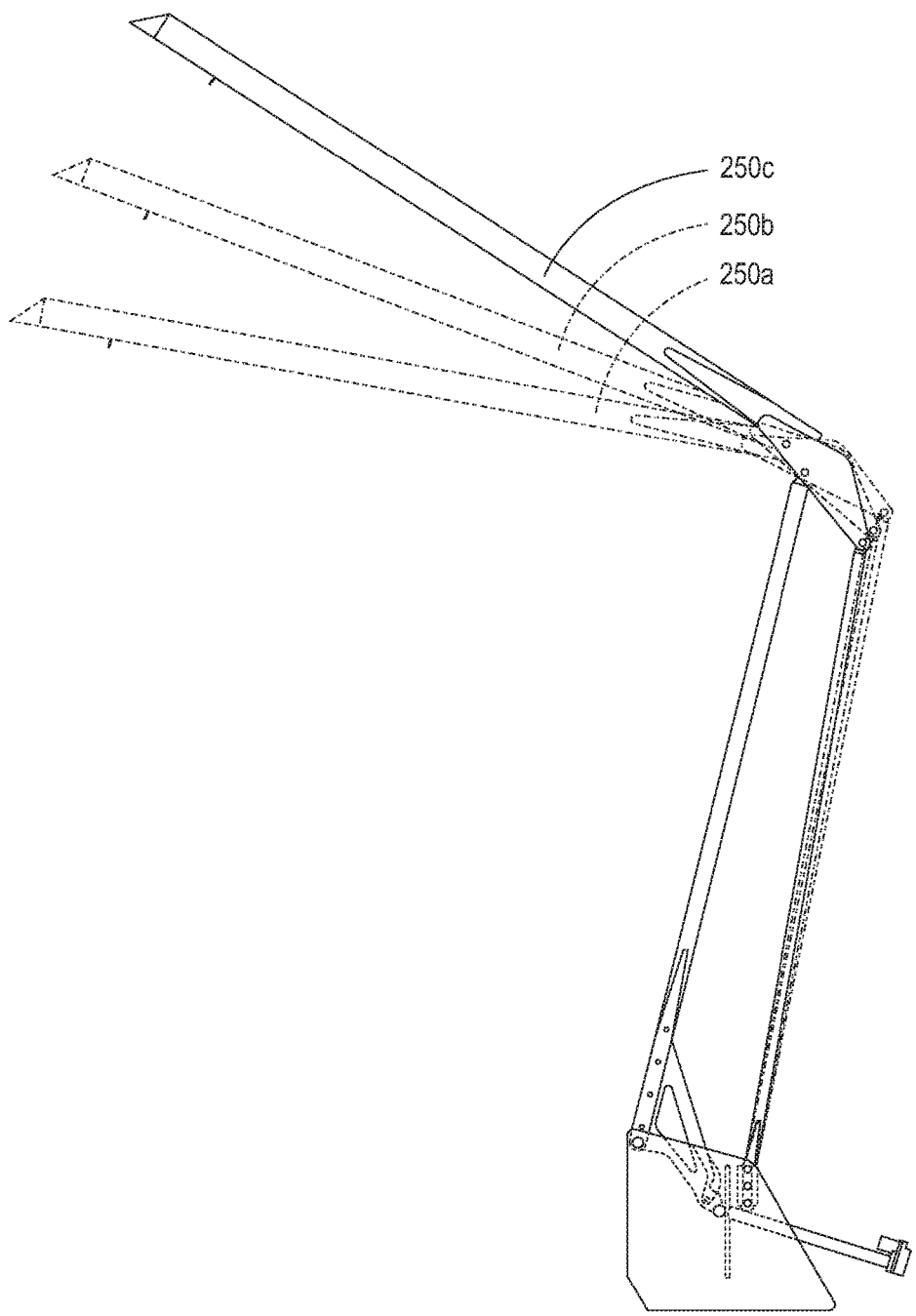

Referring briefly to FIGS. 6 and 7, the fall arrest system may be fully raised to its operating height and position entirely within an envelope space 710 defined by the system components between an unraised or transport position (FIG. 6A) and a raised position (e.g., FIG. 6E; FIG. 7, and FIGS. 12A-12B). The stages from storage to fully extended are shown in each figure by successive illustrations, where FIGS. 6A-6E show the stages in sequence, and FIG. 7 shows the stages in an overlapped fashion. In other words, raising and lowering the system does not require additional clearance above or around the structure so that the system is suitable for use indoors or for areas otherwise having limited clearance.

As will be appreciated one of the features of the system depicted in the figures is that the pivoting ring(s) or similar mechanism for attaching a flexible support is, when the system is fully erected to a fall arrest position, at a location that extends a distance D, well beyond the base support structure and associated outriggers. This compact design permits the system to be used in tight spaces while still enabling the system to reach above and even into work areas that similar systems cannot. The extended reach of the cantilever beam 250 and associated extension arm 280 is achieved, at least in part, by the position-locking support member being pivotably attached to the cantilevered beam at 290, at a distance no greater than one-half the length of the cantilever beam. This configuration provides adequate support to the beam while maintaining 7' to 8', depending on ultimate height, of unobstructed extension of the cantilever beam, thereby allowing a worker to keep the anchorage point of the fall arrest system directly overhead in most work conditions (see D in FIGS. 2 and 7 for example).

Figure 1B:
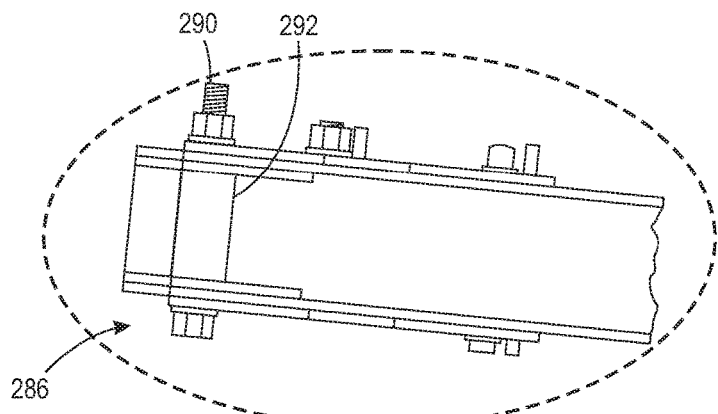
FIG. 1B is an expanded side view of vertically-oriented hinge 286 of FIG. 1A.

As illustrated in the side views of FIGS. 1-2, the fall arrest system includes a pair of fork pockets that permit the system to be lifted and transported or loaded using a fork truck or the like. The fork pockets are approximately equally spaced about the center of gravity (line 150) of the fall arrest system when the system is in the transport position (e.g., FIG. 1A).

Figure 11A:
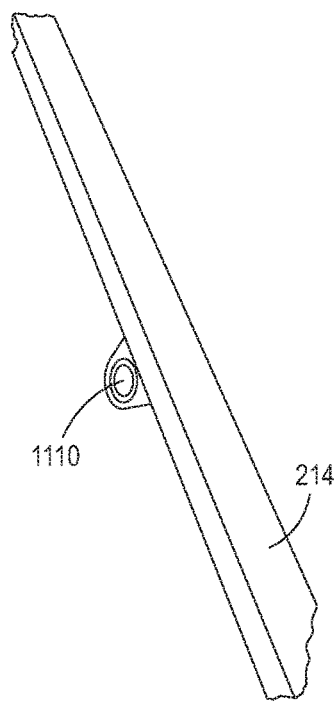
Figure 11B:
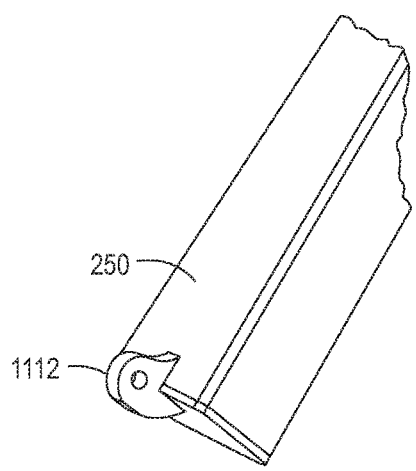

Briefly referring once again to FIGS. 2 and 3, for example, it will be appreciated that the system may be "locked" or pinned in the fully erected use position. In one embodiment of the disclosed system, if a member needs to be adjustable, in order to move between one or more positions, even if by actuator operation, the member(s) are pinned to one another so as to assure that the components are maintained in position while stored or while erected for use. In other words, when erected the positions of the four-bar linkage, the cantilevered beam and extension beam are adjusted and locked, using pins, in the use position. The linear actuators are also preferably attached between their respective members by at least one slotted receiver to which the actuator is connected, for example, an elongated receiver hole as illustrated at 1110 and 1112 in FIGS. 11A and 11B, so that when the system is in the use position or the travel position, the actuators can be adjusted to release any tensile or compressive force on the actuators. In other words, the system can be locked into position and the actuators backed-off to release any tensile or compressive forces on the actuators.

In the disclosed embodiment, the fall arrest system is capable of supporting a load of at least 600 lbs. applied at the free end of the cantilever beam or extension, at an angle of up to about 30-degrees from a downward direction. In order to improve the dampening of any off-axis dynamic loading, the system may also incorporate resilient (e.g., polyurethane) washers at one or more pivot points and connections to enable dampening of lateral loading or dynamic forces in the event of a fall.

Figure 12C:
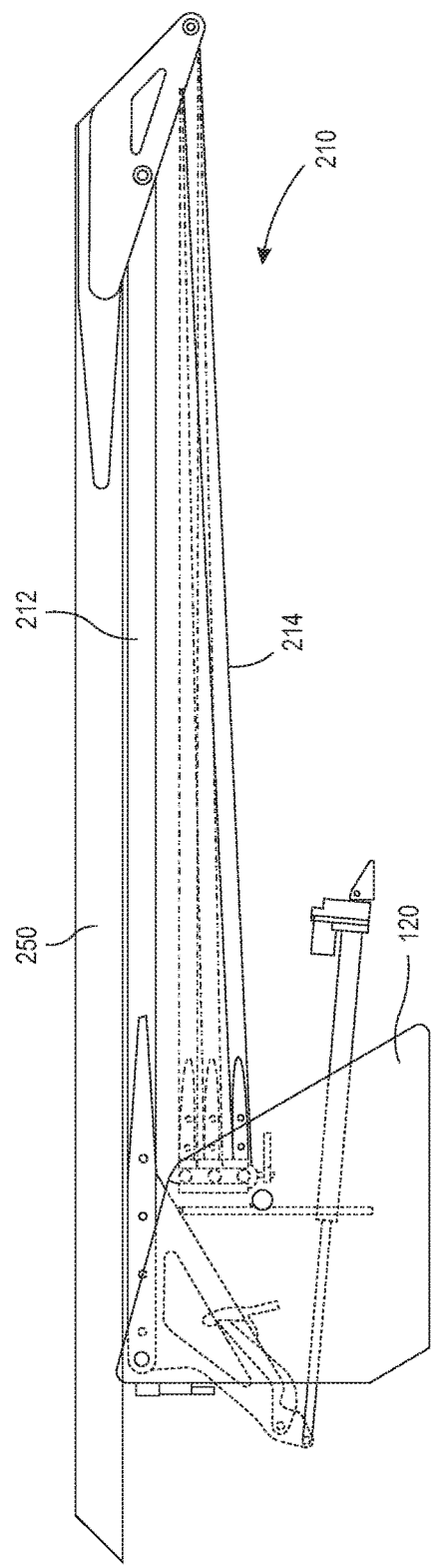
Figure 13A:
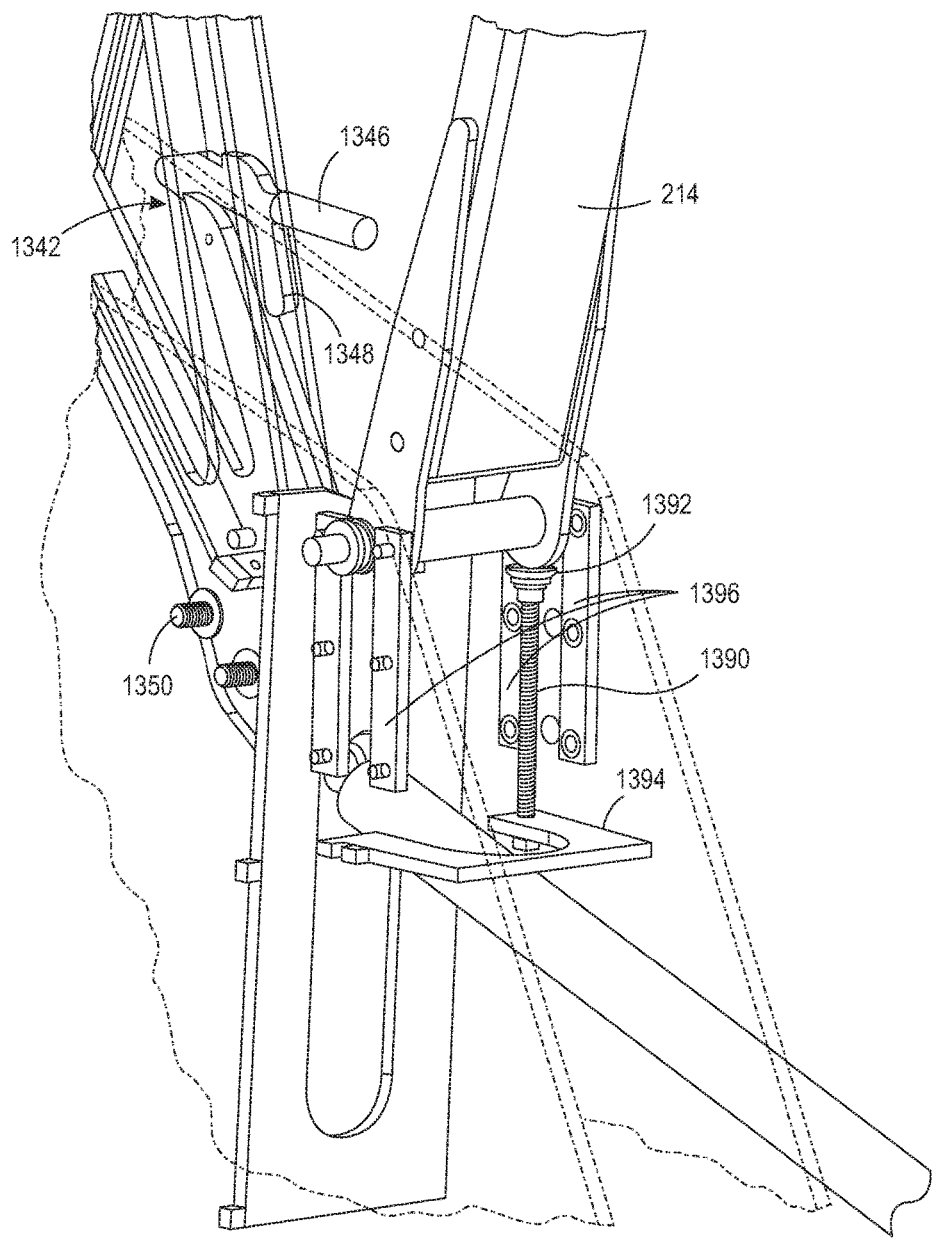
Figure 13B:
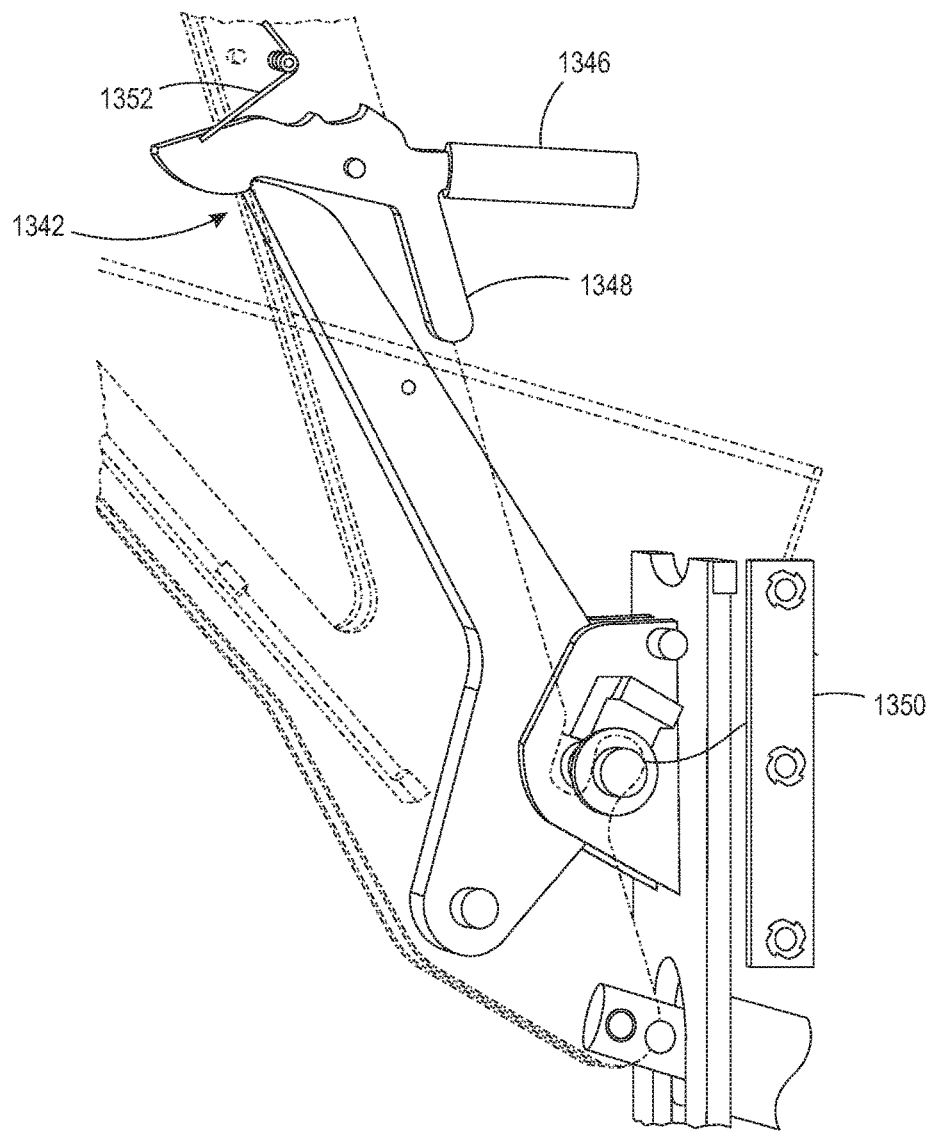
Figure 13C:
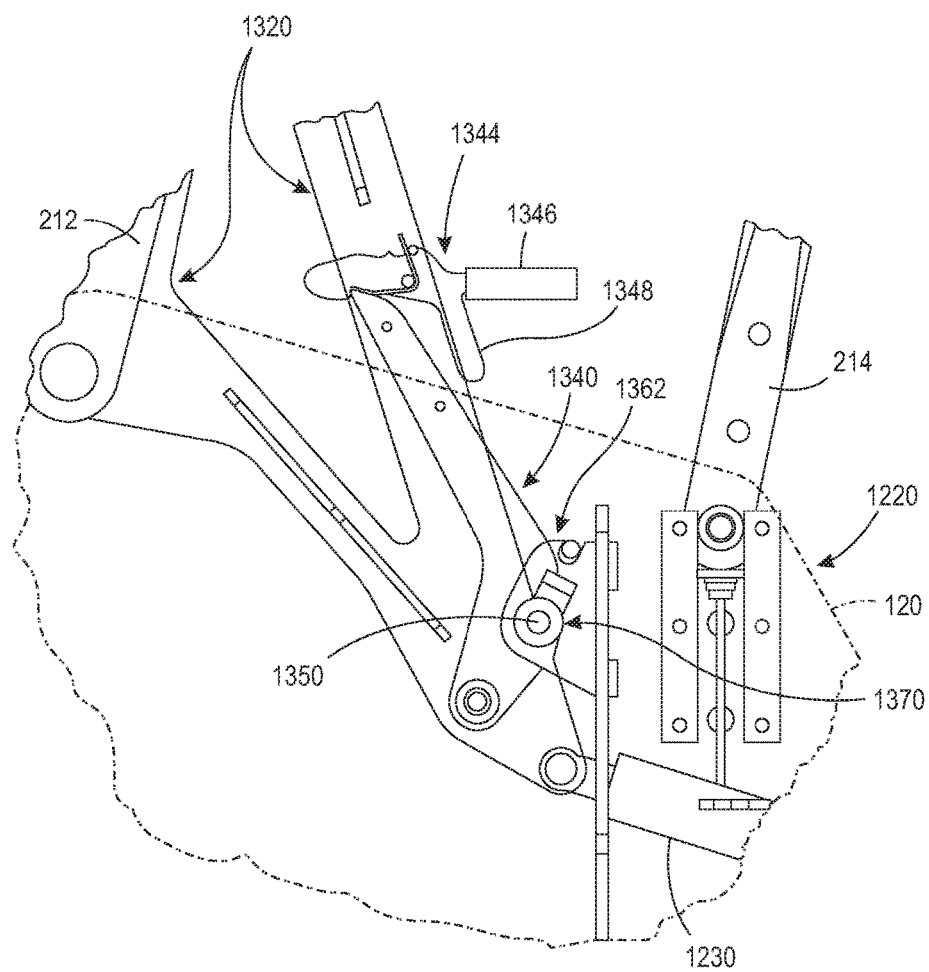
Figure 13D:
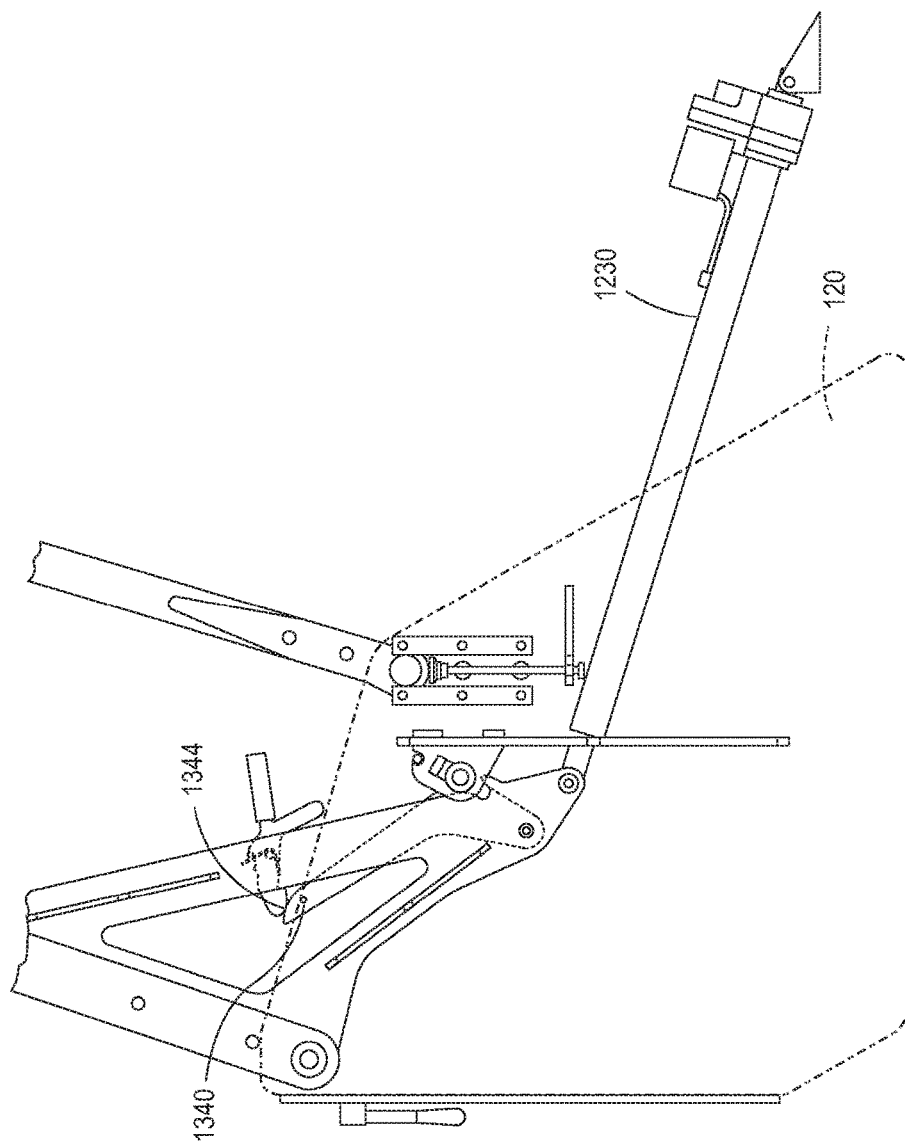

Turning next to FIGS. 12A-12C, depicted therein is an alternative embodiment for the four-bar linkage and cantilever beam, and the mechanisms by which the linkage is raised (e.g., FIGS. 12A-12B) and lowered (e.g., FIG. 12C). The four-bar linkage 210 continues to be operatively associated with the base support structure 120. The structure operates as generally described above except that the lower pivot point for one of the longitudinal bars in the linkage, lower longitudinal tube or bar 214, is manually adjustable. As illustrated in dashed-line region 1220, the bottom pivot may be adjusted downward (see arrow 1224, and also see e.g., FIG. 13C), over several possible pivot positions (1222a, 1222b, 1222c) corresponding to alternative cantilever beam heights (e.g., 250a, 250b, 250c in FIG. 12B). Referring briefly to FIG. 12B, the pivot point adjustments further result in corresponding variations of the height of beam 250 so that the height of the arrest system is selectable prior to raising the linkage 210 and associated cantilever beam 250. Furthermore, the height adjustment position does not affect the storage configuration of the four-bar linkage members. In other words, member 250 remains horizontal, regardless of the bottom pivot position detailed in 1220, when the system is in the storage position, for example as depicted in FIG. 12C.

A single linear actuator 1230 is connected between the base support structure and longitudinal tube 212 to control the raising and lowering of the linkage members. The actuator is a 24-inch long linear actuator (Manuf. by Warner Linear, Part No. K2X(EP1.0-G30-12V-24) and may be operated under power supplied to an associated electrical motor, for example by a battery(ies), and in response to a switch (e.g., one push-button switch for up and one for down). As will be appreciated, as compared to the linkage and beam design described above by including an adjustable pivot point at the base of bar or tube 214, the embodiment of FIGS. 12A-13C, eliminates an actuator between the four-bar linkage and beam, thereby reducing cost and simplifying the design and operation of the fall arrest system. As shown, for example in FIG. 13A, a threaded rod 1390, having a rest 1392, supports a lower end of the tube 214 for adjustment of the pivot point. The rod, passing through a threaded hole or bushing in plate 1394, may be used to manually adjust the pivot point of the tube member 214, although at all times the lower end pivot is constrained to vertical movement within guides 1396.

Referring to FIGS. 13A-13D, the details of the connection between the bars or tubes 212, 214 and the base support structure 120 are further illustrated in detail. Also illustrated is an improved self-locking mechanism that is intended to replace a manual, pin-type lock that holds the arrest system in its full-upright position during use. The use of latch plates 1340 and 1344 associated with the mast support plate 1320, allow the actuator to drive the four-bar linkage or mast to the full upright position where the latch is self-actuated as the linkage is raised to the operating height (see e.g., FIG. 13D)—the end of the primary latch plate 1340 becomes captured by the secondary latch plate 1344 (biased by spring 1352) and by pin 1350. The mechanism automatically latches as the four-bar linkage is driven to the full extension height, where pin 1350 pushes on primary latch plate 1340 causing latch plate to rotate. As primary latch plate 1340 rotates, secondary latch plate 1320 is caused to rotate until primary latch plate 1340 is captured in recess of secondary latch plate 1344. The position of pin 1350 is adjusted via the height of bumper 1370, such that latching occurs when the system is in a full-upright position. In this upright locked position, pin 1350 is enclosed by half slot of primary pivot plate 1340 and half slot of mast support plates 1320.

To release the latch, when the system is to be lowered, handle 1346 on latch plate 1344 is pushed downward so that the end of the primary latch plate is released by the secondary latch plate (at 1342) and arm 1348 comes into contact the primary latch plate. Rotation of the primary latch plate forces the pin out of the locked position and permits the mast support plate to rotate under the control of actuator 1230 and to lower the linkage and beam. As will be appreciated, another advantage of this configuration is that the actuator 1230 is maintained in tension as the linkage or mast is raised and lowered.

Referring briefly to FIG. 14, disclosed therein is an integrated tow dolly 1410, which may be operatively attached to towing tongue 132 extending from one end of the base support structure. Such a device would be raised or lowered from the tongue, and would replace conventional casters as described relative to an embodiment above. The tow dolly includes a vertical tube 1420 in the form of a jack stand (not shown), and a foot 1430 attached at the bottom thereof. In a storage or use position the foot remains in contact with the ground or surface upon which the system is located. To move the system, a bar 1440, with an associated handle 1442, is attached and upon raising the handle end of the bar (or optionally lowering), the wheels are forced downward so as to contact the surface and raise the foot 1430 off the ground or surface. The apparatus can then be moved by pulling on the handle and the wheels will remain aligned with the direction of the handle to permit the unit to be steered. As a result of a four-bar mechanism employed relative to the handle and wheels, which allows the wheels to displace the foot, it will be appreciated that if the handle is lowered (dropped), the wheels raise and the foot again comes into contact with the ground and acts as a brake so that system cannot move further.

In yet another alternative embodiment, it may be possible to eliminate the need for the linear actuators by employing spring struts pressurized in a manner that causes the system to move to a fully erect use position under the force of the struts alone. In such an embodiment the spring struts are pre-loaded at a pressure that results in the system moving to the fully erected use position upon release of a tethering mechanism (e.g., cable winch), where the tethering mechanism could also be employed to "pull" the components from the erected use position back into a storage position.

In another alternative embodiment, it is contemplated that the system may include a tilt switch for sensing the angular orientation of the system, or at least the base support structure, and where in the event of an excessive tilt angle an alarm can be sounded or displayed, and/or activation of the motor(s) for the linear actuator(s) is automatically disabled. Other possible modifications may include an alternative position for the towing tongue and connection on the rear of the base support structure adjacent or as part of the cradle.

Also contemplated is a base support structure that is capable of being rotated or swiveled relative to the system wheels/anchors in order to provide up to 360-degree rotation of the beams to increase the range of the fall assist system.

In a further alternative embodiment, the disclosed system may be employed to support a load, such as in a temporary hoist system, where the free end of the cantilever beam (or extension arm) may be fitted with a pulley or even a powered hoist of similar component suitable to raise and lower a load, thereby allowing the system to be employed as a crane of sorts.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A fall arrest system, comprising:
a base, said base including a base support structure, a plurality of wheels attached to the support structure, a plurality of adjustable anchors pivotably attached to and extendable from the base support structure each having a ground-contacting pad thereon, a towing tongue extending from one end of the base support structure, a power source;
a four-bar linkage operatively connected to said base support structure, which operates as one of the bars in said linkage, said four-bar linkage further including an upper longitudinal tube and a lower longitudinal tube, each pivotably coupled to the base support structure and extending generally in parallel with one another, and where the opposite ends of the longitudinal tube pieces are also pivotably connected to a cantilever linkage member; and
a cantilevered beam extending from the cantilever linkage member, said cantilevered beam having a mechanism for attaching a flexible support to the free end thereof to arrest the fall of a worker attached to the arrest system via the flexible support;
wherein when the system is in a first position for storage or transport the upper longitudinal tube, lower longitudinal tube and cantilever beam are generally parallel with one another and when the system is in a second position for fall arrest of the worker the cantilever beam extends approximately perpendicular to the generally parallel upper longitudinal tube and lower longitudinal tube.

2. The fall arrest system according to claim 1, wherein a pivot position of the lower longitudinal tube of the four-bar linkage is adjustable between one of a plurality of positions to adjust the ultimate height of the free end of the cantilevered beam.

3. The fall arrest system according to claim 1, further including an extension beam operatively attached to the free end of the cantilever beam, where said extension beam comprises an aluminum tubular member pivotably attached by a vertically-oriented hinge such that the extension beam swings between a transport position parallel with the cantilever beam and a use position that extends the cantilevered beam.

4. The fall arrest system according to claim 1, wherein said system further comprises a resilient polyurethane bushing in at least one pivot location to dampen lateral forces applied to the system in the event of a fall.

5. The fall arrest system according to claim 1, wherein said system may be fully raised to its operating height and position entirely within a space defined by the system between an unraised transport position and a raised position.

6. The fall arrest system according to claim 1, wherein the free end of the cantilever beam, when in the operating position, is at a location that extends beyond the base support structure and adjustable anchors extending from the base support structure.

7. The fall arrest system according to claim 1, further including a pair of fork pockets, said fork pockets being approximately equally spaced about the center of gravity of the fall arrest system when in a transport position.

8. The fall arrest system according to claim 1, wherein at least two of the adjustable anchors are outriggers formed of aluminum tubing pivotably attached at one end to the base support structure, and including a ground-contacting pad attached near an opposite end of the anchor, and further including an adjustable turnbuckle that can be pinned between the anchor and the base support structure to adjust the position of the anchor and to level the fall arrest system.

9. The fall arrest system according to claim 8 wherein the ground-contacting pad includes a ball and pin swivel connection, and where the connection is attached to the anchor using a wedge-shaped spacer to assure that the contacting pad is in full contact with a surface below it.

10. The fall arrest system according to claim 1, further including a slidable cradle, said slidable cradle telescoping from the support structure, wherein an exposed end of the slidable cradle includes a lock mechanism to engage and support the lower longitudinal tube when the fall arrest system is stored in a travel position.

11. A fall arrest system, comprising:
a base, said base including a base support structure, a plurality of wheels attached to the support structure, a plurality of adjustable anchors extendable from the base support structure, a towing tongue extending from one end of the base support structure, a power source;
a four-bar linkage operatively connected to said base support structure, which operates as one of the bars in said linkage, said four-bar linkage further including an upper longitudinal tube and a lower longitudinal tube, each pivotably coupled to the base support structure and extending generally in parallel with one another, and where the opposite ends of the longitudinal tube pieces are also pivotably connected to a cantilever linkage member, wherein the positions of at least one member of the four-bar linkage has an adjustable and lockable pivot position, and wherein all adjustable pivot positions are near ground level such that the height of the free end of the cantilevered beam is adjustable from the ground; and
a cantilevered beam extending from the cantilever linkage member, said cantilevered beam having a mechanism for attaching a flexible support to the free end thereof to arrest the fall of a worker attached to the arrest system via the flexible support.

12. The fall arrest system according to claim 11, wherein at least one linear actuator is connected between the base support structure and one of the upper or lower longitudinal tubes, so that when the system is in a use position or a travel position, the actuator can be adjusted to release any tensile or compressive force on the actuators.

13. The fall arrest system according to claim 1, wherein the system is capable of supporting a load of at least 600 lbs. statically applied at the end of the cantilever beam at an angle of up to 30-degrees from a downward direction.

14. The fall arrest system according to claim 1, further including a resilient member at least one pivot point to dampen lateral loading and dynamic forces in the event of a fall.

15. The fall arrest system according to claim 1, wherein the system may be repositioned, on a flat surface, while in the use position.

16. The fall arrest system according to claim 1 further including at least one pre-loaded spring strut to assist with reducing the force required to move the cantilevered beam.

17. The fall arrest system according to claim 1, further including:
at least one enclosed box attached to the base support structure; and a level indicator operatively associated with the base support structure.

18. The fall arrest system according to claim 1, wherein said cantilevered beam includes an extension beam connected to the free end of the cantilevered beam.

19. The fall arrest system according to claim 12 wherein at least one pre-loaded spring strut operates in conjunction with said at least one linear actuator.

20. The fall arrest system according to claim 19 wherein the at least one pre-loaded spring strut reduces the force required for the linear actuator to raise the cantilevered beam.

* * * * *